US008166257B1

(12) United States Patent
Holl, II et al.

(10) Patent No.: US 8,166,257 B1
(45) Date of Patent: Apr. 24, 2012

(54) AUTOMATED CONTINUOUS PROVISIONING OF A DATA STORAGE SYSTEM

(75) Inventors: James H. Holl, II, Los Gatos, CA (US); James J. Voll, Palo Alto, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 634 days.

(21) Appl. No.: 12/019,574

(22) Filed: Jan. 24, 2008

(51) Int. Cl.
*G06F 13/00* (2006.01)
*G06F 13/28* (2006.01)

(52) U.S. Cl. .. 711/154; 711/114; 711/170; 711/E12.084

(58) Field of Classification Search .................. None
See application file for complete search history.

(56) References Cited

U.S. PATENT DOCUMENTS

| | | | |
|---|---|---|---|
| 5,568,629 A | 10/1996 | Gentry et al. | |
| 5,889,934 A | 3/1999 | Peterson | |
| 6,801,992 B2 * | 10/2004 | Gajjar et al. | 711/173 |
| 7,127,577 B2 | 10/2006 | Koning et al. | |
| 7,237,021 B2 | 6/2007 | Penny et al. | |
| 2007/0088702 A1 | 4/2007 | Fridella et al. | |
| 2008/0208917 A1 * | 8/2008 | Smoot et al. | 707/200 |

OTHER PUBLICATIONS

Alvarez, Guillermo A. et al., "MINERVA: An Automated Resource Provisioning Tool for Large-Scale Storage Systems," ACM Transactions on Computer Systems, vol. 19, No. 4, Nov. 2001, pp. 483-518.
Anderson, Eric et al., "Quickly Finding Near-Optimal Storage Designs," ACM Transactions on Computer Systems, vol. 23, No. 4, Nov. 2005, pp. 337-374.
Gelb, Jack P., "System-Managed Storage," IBM Systems Journal, vol. 28, No. 1, 1989, pp. 77-103.
Zadok, Erez, et al., "Reducing Storage Management Costs Via Informed User-Based Policies", Technical Report FSL-03-01, pp. 1-16, 2004.

* cited by examiner

*Primary Examiner* — Reginald Bragdon
*Assistant Examiner* — Eric S Cardwell
(74) *Attorney, Agent, or Firm* — Blakely, Sokoloff, Taylor & Zafman LLP.

(57) ABSTRACT

Methods and systems for mapping data-management requirements to the provisioning of a data storage system to conform to a set of user-defined data-management policies. A conformance engine with storage system awareness translates the set of data-management policies to a corresponding set of storage-provisioning policies and provisions the resources of the storage system thereby to conform the storage system to the data-management policies. A conformance checker continuously and automatically compares the provisioning of the storage system resources to the provisioning required to meet the data-management policies. When nonconformance is detected, the conformance engine automatically re-provisions the available resources of the storage system to conform the storage system to the data management policies.

20 Claims, 9 Drawing Sheets

AUTOMATED CONTINUOUS PROVISIONING OF A DATA STORAGE SYSTEM

TECHNICAL FIELD

Embodiments of the invention are related to the management of data storage systems and, in particular, to tools for automatically and continuously conforming a state of a current allocation of resources of a data storage system to a provisioning policy.

BACKGROUND

As data management applications become more advanced and complicated, the provisioning of storage for the applications in a network storage system becomes increasingly difficult. Conventionally, storage "provisioning" is the allocation of data storage resources to satisfy storage-centric metrics such as data integrity, data redundancy and data availability. Typically, a storage administrator allocates storage resources based upon the needs of an application running on a client system that uses disk space. A storage administrator has to make numerous decisions, such as how to monitor the available space for the storage object, how to schedule data backups, how to configure backups, whether the data should be mirrored, where data should be mirrored, etc. Answers to the above questions may be summarized in a data management policy. In general, a data management policy includes a description of the desired behavior of the associated data set. For instance, a data management policy may describe how the storage should be used and configured. One exemplary data management policy is a data protection policy, which describes how storage objects in a data set should be protected. Attributes associated with a data management policy are generally specified at the highest node possible. Additionally, when there are changes, such as in the characteristics of an application, the characteristics of the storage server, the capability of the storage devices, the network topology or the availability of storage in a data center, the administrator may need to revise earlier decisions on storage allocations and take necessary corrective action, such as migrating existing data from existing disks to new disks. The changing of earlier decisions of storage allocation may be complex, time-consuming and error-prone, and may result in storage server unavailability.

Frequently, storage administrators do not have the tools or knowledge to process information such as the changes described above and to take the appropriate actions. Further, even if the tools are available to take corrective actions, the effort and cost involved may deter the administrators from taking the actions. Thus, sub-optimal usage of storage capacity often results and the performance of an application is subsequently degraded by storage space limitations or data throughput bottlenecks, for example.

Another issue that storage administrators face is the heterogeneity of storage interfaces for each of the different types of storage devices that are deployed in the storage system. For example, a single storage system may include storage devices with different storage interfaces. Each of the storage interfaces has different capabilities that make it very difficult, if not impossible, for storage administrators to configure storage in a consistent and uniform manner. U.S. Pat. No. 6,801,992 describes creating storage provisioning policies by specifying storage heuristics for storage attributes using storage heuristic metadata. As used here, storage heuristic is a generalized rule or algorithm, derived from experience, which expresses a relationship between a storage attribute and a performance metric of the storage system. Storage attributes characterize a storage device (e.g., capacity, latency, transfer rate, etc.) and storage heuristic metadata describe how to specify a storage heuristic. Using the storage heuristic metadata, storage heuristics are defined to express a rule or constraint as a function of a discoverable (e.g., software discoverable) storage attribute. A storage profile is a collection of storage heuristics. By including specific storage heuristics in a storage profile, only the storage devices that meet the heuristics are provisioned.

While this approach provides a solution for static storage management, it does not satisfactorily address the integration and dynamic management of data and storage. Contemporary storage systems separate the management of data (e.g., file systems and structured data such as databases) from the management of the underlying physical disks, aggregates and logical units numbers (LUNs) used to store the data. Data administrators are concerned with the redundancy, performance, persistence and availability of their data. Storage administrators are focused on delivering physical infrastructure that satisfies the data's storage requirements. Typically, the storage resources are provisioned and then, within the constraints of the provisioned storage resources, data management takes place. If the data management needs require that the storage resources be re-provisioned, the process can be very disruptive, perhaps involving many domain specific administrators who must work closely together to manage the changes.

Modern consolidated single-architecture storage systems (such as the FlexVol™ flexible volume technology available from Network Appliance, Inc. of Sunnyvale, Calif.) provide virtualized features such as space-efficient (e.g., write-anywhere) data replication that result in a storage infrastructure that eliminates much of the incompatibility and inflexibility found in other storage environments. However, even in such environments, data management and storage management remain separate disciplines. For example, a storage administrator may manage flexible volumes and aggregates for provisioning storage using data mirroring tools to make copies of the flexible volumes. A data administrator, on the other hand, manages files and structured data abstracted from physical storage and thinks in terms of copying those files and structured data without regard to the underlying physical storage.

Mapping the data management requirements to the storage management requirements typically needs human interaction and complex processes that are error-prone. Moreover, as storage systems grow larger and more complex, the task of provisioning a storage system to meet data management requirements increasingly challenges human capability. Additionally, over time, the load imposed on provisioned storage changes, the relative costs of different storage system resources changes and the relative risk of failure of different storage system resources changes. As a result, the state of a current allocation of resources of a storage system drifts away from the goals specified by any initial provisioning decisions.

SUMMARY

Embodiments of the invention include methods and systems for provisioning a data storage system to conform to a data management policy. In one embodiment, the method includes allowing an administrator of a data storage system to define a data set having a plurality of storage objects and to associate the data set with a data management policy. Each of the storage objects includes a logical representation of a collection of data and replicas of the collection of data. The collection of data is stored in storage containers. The storage containers are managed by storage servers in the data storage system, wherein the storage containers are independent of the logical representation of the collection of data. The state of conformance is continuously and automatically determined. The state of conformance can be determined by comparing a state of a data set against a data management policy associated with the data set to determine if the data set currently conforms to the data management policy. If nonconformance is detected, the conformance checker automatically re-provisions the available resources of the storage system to conform the storage system to the data management policy.

In one embodiment, the conformance checker may model prospective provisioning changes before the changes are implemented and provide an analysis to an administrative user interface for authorization.

In one embodiment, the conformance module may send a notification to the administrative user interface if the available resources of the storage system cannot be provisioned to conform to the data-management policies.

Other aspects of the invention will become apparent from the following detailed description taken in conjunction with the accompanying drawings, which illustrate the principles of the invention by way of example.

BRIEF DESCRIPTION OF THE DRAWINGS

Embodiments of the invention are illustrated by way of example, and not by way of limitation, in the figures of the accompanying drawings in which like reference numerals refer to similar elements and in which.

DETAILED DESCRIPTION

Methods and systems for the automatic and continuous provisioning of a data storage system are described herein that continuously and automatically monitor and dynamically re-provision the data storage system to maintain conformance with the data management policies of the data administrator as both the data and the storage system undergo changes. The automatic and continuous provisioning described herein ensures allocation of storage resources for conformance to data management policies.

Figure 1:
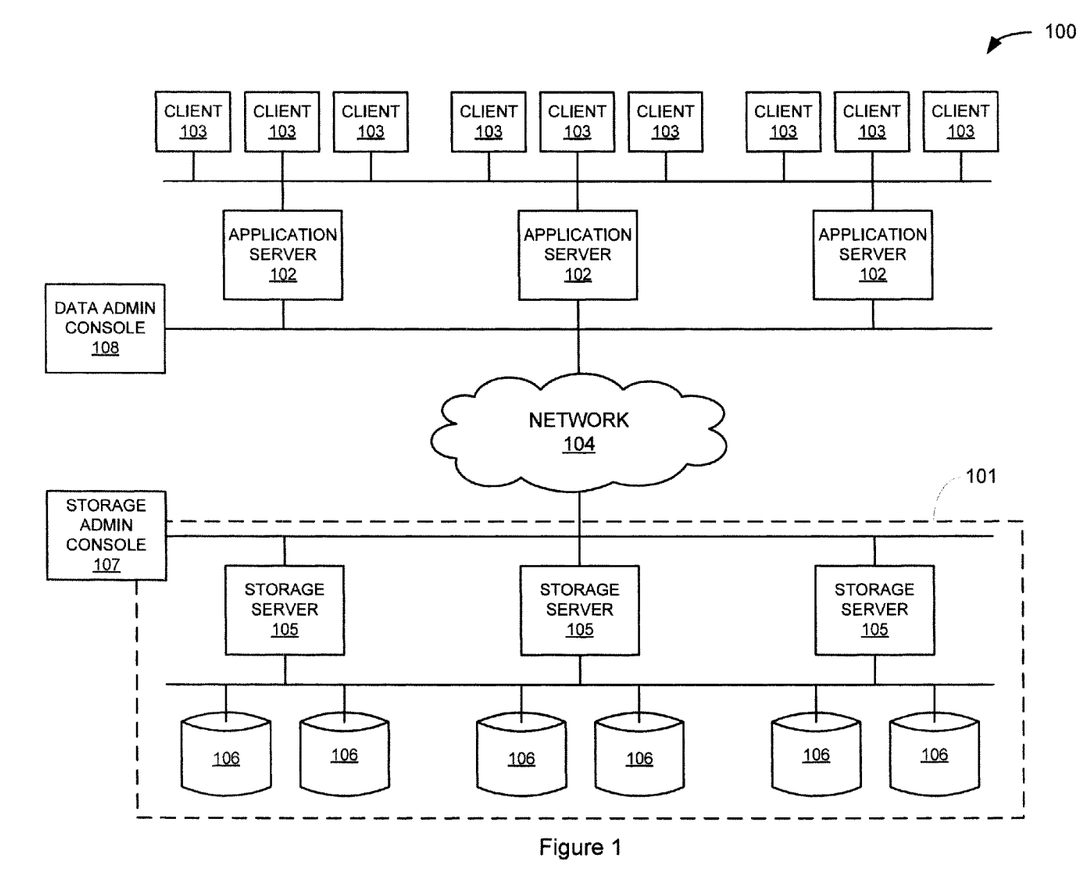
FIG. 1 is a block diagram illustrating a network environment that includes a storage system capable of implementing automated continuous provisioning according to an embodiment of the invention.

FIG. 1 illustrates a network 100 in which embodiments of the invention may be implemented. Network 100 includes a storage system 101 connected to one or more networked application servers 102 serving one or more clients 103. Storage system 101 may be connected to application servers 102 via a network 104. Application servers 102 may be, for example, Microsoft Windows servers, UNIX or LINUX servers, Oracle database servers or the like. Network 104 may be, for example, a local area network (LAN), wide area network (WAN), metropolitan area network (MAN), the Internet or other network as is known in the art or combinations thereof. Storage system 101 includes one or more networked storage servers 105 connected to one or more networked mass storage devices 106, which may include, for example, magnetic disks, magnetic tape, optical storage devices such as DVDs and/or any other similar media adapted to store data persistently. In one embodiment, mass storage devices 106 are organized as one or more groups of Redundant Array of Independent (or Inexpensive) Disks (RAID).

Application servers 102 are computers that handle requests for data, electronic mail, file transfers and other network services from client systems 103. Application servers 102 utilize the services of storage system 101 to store and manage data in the mass storage devices 106.

Application servers 102 may communicate with storage system 101 by using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, application servers 102 may communicate with storage system 101 using block-based access protocols, such as the Small Computer Systems Interface (SCSI) protocol encapsulated over TCP (iSCSI) and SCSI encapsulated over Fibre-Channel® Protocol (FCP), when accessing information in the form of data blocks.

Storage system 101 may be connected to a storage administrator's console 107, which may be used by a storage administrator to create data management policies to provision storage space on mass storage devices 106. Similarly, application servers 102 may be connected to a data administrator's console 108, which may be used by a data administrator to create data management profiles for data sets associated with each of application servers 102.

Figure 2A:
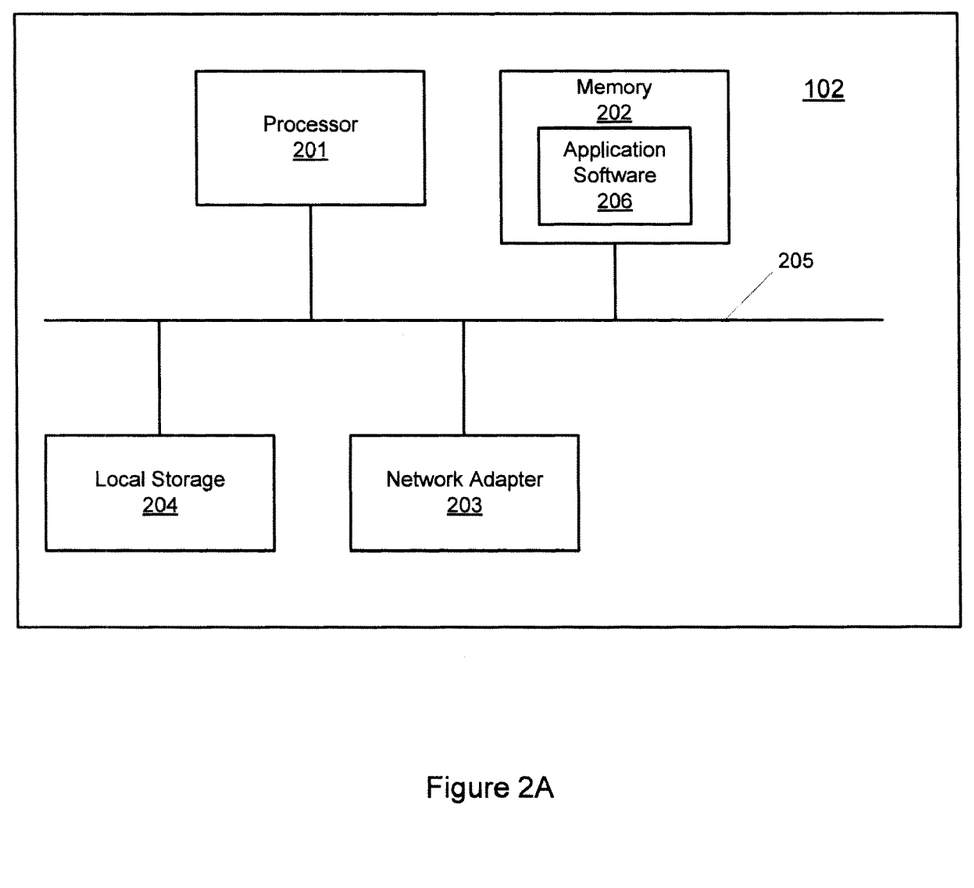
FIG. 2A is a block diagram illustrating an application server in one embodiment.

FIG. 2A is a block diagram illustrating an exemplary application server 102 in one embodiment. Application server includes processor 201, memory 202, a network adapter 203 and local storage 204 coupled by a bus 205. The processor 201 is the central processing unit (CPUs) of the application server 102 and controls the overall operation of application server 102. In certain embodiments, processor 201 executes software 207 in memory 202. Processor 201 may include one or more programmable general-purpose or special-purpose microprocessors, digital signal processors (DSPs), programmable controllers, application specific integrated circuits (ASICs), programmable logic devices (PLDs), or the like, or a combination of such devices.

Memory 202 includes storage locations that are addressable by processor 201 and network adapter 203 for storing application software 206. Processor 201 and adapter 203 may, in turn, include processing elements d/or logic circuitry configured to execute the software code. Memory 202 may be a random access memory (RAM), a read-only memory (ROM), or the like, or a combination of such devices. It will be apparent to those skilled in the art that other processing and memory means, including various computer readable media, may be used for storing and executing program instructions pertaining to the invention described herein.

Network adapter 203 includes a plurality of ports adapted to couple the application server 102 to one or more clients 103 and to network 104.

Local storage 204 is a non-volatile storage device that stores information within application server 102, such as data and application software 206. Application server 102 loads application software 206 into memory 202 where it is accessed by processor 201.

Figure 2B:
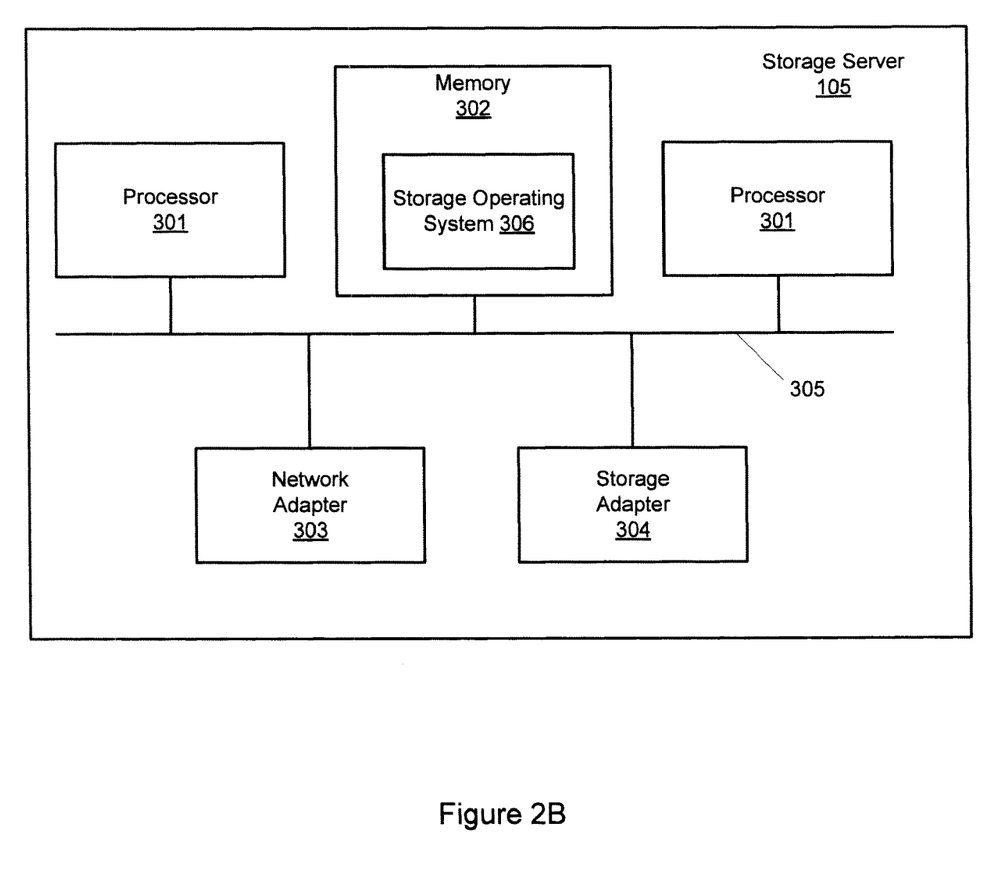
FIG. 2B is a block diagram illustrating a storage server in one embodiment.

FIG. 3 is a block diagram illustrating components of an exemplary storage server 105 in one embodiment. Storage server 105 may include one or more processors 301, a memory 302, a network adapter 303 and a storage adapter 304 interconnected by a system bus 305. Storage server 105 executes a storage operating system 306 to logically organize data as a hierarchical structure of named directories, files and various types of logical and physical data containers on storage devices 106 and to sense requests from application servers 102.

Memory 302 includes storage locations that are addressable by the processors 301 and adapters 303 and 304 for storing software program code and data structures associated with the present invention. The processor and adapters may, in turn, include processing elements and/or logic circuitry configured to execute the software code and manipulate various data structures.

Storage operating system 306, functionally organizes storage system 101. In one embodiment, storage operating system 306 may be a version of the NetApp® DataONTAP® storage operating system available from Network Appliance Inc., of Sunnyvale, Calif., that implements a Write Anywhere File Layout (WAFL®) file system. However, it is contemplated that any appropriate storage operating system may be enhanced for use in accordance with the inventive principles described herein to facilitate data storage and management. Storage operating system 306 "virtualizes" the storage space provided by storage devices 106 and logically organizes data as a hierarchical structure of named directory and file objects ("directories" and "files") on the disks.

Network adapter 303 includes a plurality of ports adapted to couple storage server 105 to one or more application servers over network 104.

Storage adapter 304 cooperates with the storage operating system 306 to access information requested by application servers 102. Storage adapter 304 includes a plurality of ports having input/output (I/O) interface circuitry that couples to the storage devices 106 over an I/O interconnect arrangement, such as a FibreChanne® link topology, for example. In one embodiment, storage server 105 may operate in the context of network attached storage (NAS) where storage server 105 operates as a file server. A file serve operates on behalf of one or more application servers 102 to store and manage shared files in storage devices 106. As noted above, storage devices 106 may include one or more arrays of mass storage devices organized as RAID arrays. In one embodiment, storage server 105 may operate in the context of a storage area network (SAN) context where storage server 105 provides clients with block-level access to stored data, rather than file-level access. Some storage servers are capable of providing clients with both file-level access and block-level access, such as certain filers made by Network Appliance, Inc. of Sunnyvale, Calif.

In some storage servers, data is stored in logical containers called volumes and aggregates. An "aggregate" is a logical container for a pool of storage resources, combining one or more physical mass storage devices (e.g., disks) or parts thereof into a single logical storage object, which contains or provides storage for one or more other logical data sets at a higher level of abstraction (e.g., volumes). A "volume" is a set of stored data associated with a collection of mass storage devices, such as disks, which obtains its storage from (i.e., is contained within) an aggregate, and which is managed as an independent administrative unit. A volume includes one or more file systems which may be active file systems (i.e., subject to dynamic read and write operations) and, optionally, one or more persistent point-in-time images ("snapshots") of the active file systems captured at various instances in time. A "file system" is an independently managed, self-contained, hierarchal set of data units. A volume or file system may store data in the form of files or in the form of other units of data, such as blocks or logical units (LUNs).

A volume may be a traditional volume or a flexible volume. A "traditional volume" has a fixed, one-to-one relationship with the underlying physical storage (aggregate). In contrast, a "flexible volume" is flexibly associated with the underlying aggregate. In other words, the boundaries between aggregates and flexible volumes are flexible, such that there does not have to be a one-to-one relationship between a flexible volume and an aggregate. An aggregate can contain one or more flexible volumes which can be grown in capacity to accommodate various data sets as described below.

In one embodiment of the present invention, a data-management architecture is provided that unifies storage management on the storage server side of network 100 and data management on the application server side of network 100, and that allows storage administrators to securely delegate storage management to data administrators such that global data management policies are enforced and maintained. The architecture maintains the following management objects: data sets, resource pools and policies. The architecture also includes several storage infrastructure components: a role-based access control module, a conformance module and a centralized database that holds the definitions of the management objects.

A data set is independent of any particular physical infrastructure that is currently being used to store its data and is the basic entity that a data administrator manages. A resource pool is a collection of physical storage resources managed by storage administrators. A policy can be used to describe the desired behavior of the data. Role-based access control (RBAC) is used to control access to all managed entities including data sets, policies and resource pools. The conformance module is responsible for monitoring and configuring the storage infrastructure such that a data set is always in conformance with its policy.

Using these objects and infrastructure elements, a storage administrator controls how storage is used by defining specific storage policies and controls the rights to use these policies with the RBAC. Once a storage administrator has configured the policies and access controls, data administrators can create or administer their data sets by assigning policies from an authorized set of policies. Changes in storage policies allow re-configuration of the storage, and this re-configuration is done automatically using the conformance module, providing a substantial increase in efficiency when compared with systems in which storage management and data management are separated.

For example, in the case of data redundancy requirements, the storage administrator first configures resource pools with varying kinds of physical redundancy, such as RAID levels or failover storage capabilities (as known in the art, failover is the transfer of storage management responsibilities between clustered storage servers when one or more of the clustered storage servers fails). The storage administrator then constructs policies that can be used to create data sets with varying degrees of physical and backup redundancy. When a data administrator requires storage for a data set, the data administrator selects a policy that provides the appropriate levels of redundancy. The conformance module then provisions the storage resources required on the appropriate storage media and replicates the data. The conformance module also monitors the storage to handle scenarios in which the data set is no longer in conformance with the selected policy.

Other types of policy-based storage management systems are known in the art. Commercial data management systems such as Brocade StorageX, Opsware and Symantec utilize policy-based storage management for many management tasks. However, the policies in these systems are intended to automate tasks within a single administrative domain, not as a mechanism to delegate control between domains such as a data-management domain and a data-storage domain.

Resource Pools

A resource pool contains storage from which data sets can be provisioned. A resource pool may be constructed from disks, volumes, aggregates or an entire storage system. If a resource pool is constructed using an entire storage system then it includes all of the disks and pre-created aggregates on that storage system, including any additional aggregates or disks that are later added. There might be many storage systems or aggregates from multiple storage systems in a single resource pool. The resource pool definition is stored in a persistent database (such as discussed below with reference to storage system database 501 in FIG. 5).

A resource pool serves at least two purposes. The first is to reduce the total number of distinct objects that a storage administrator must manage, and the second is to allow more opportunities for space-balancing and workload-balancing optimizations among the storage resources.

Figure 4:
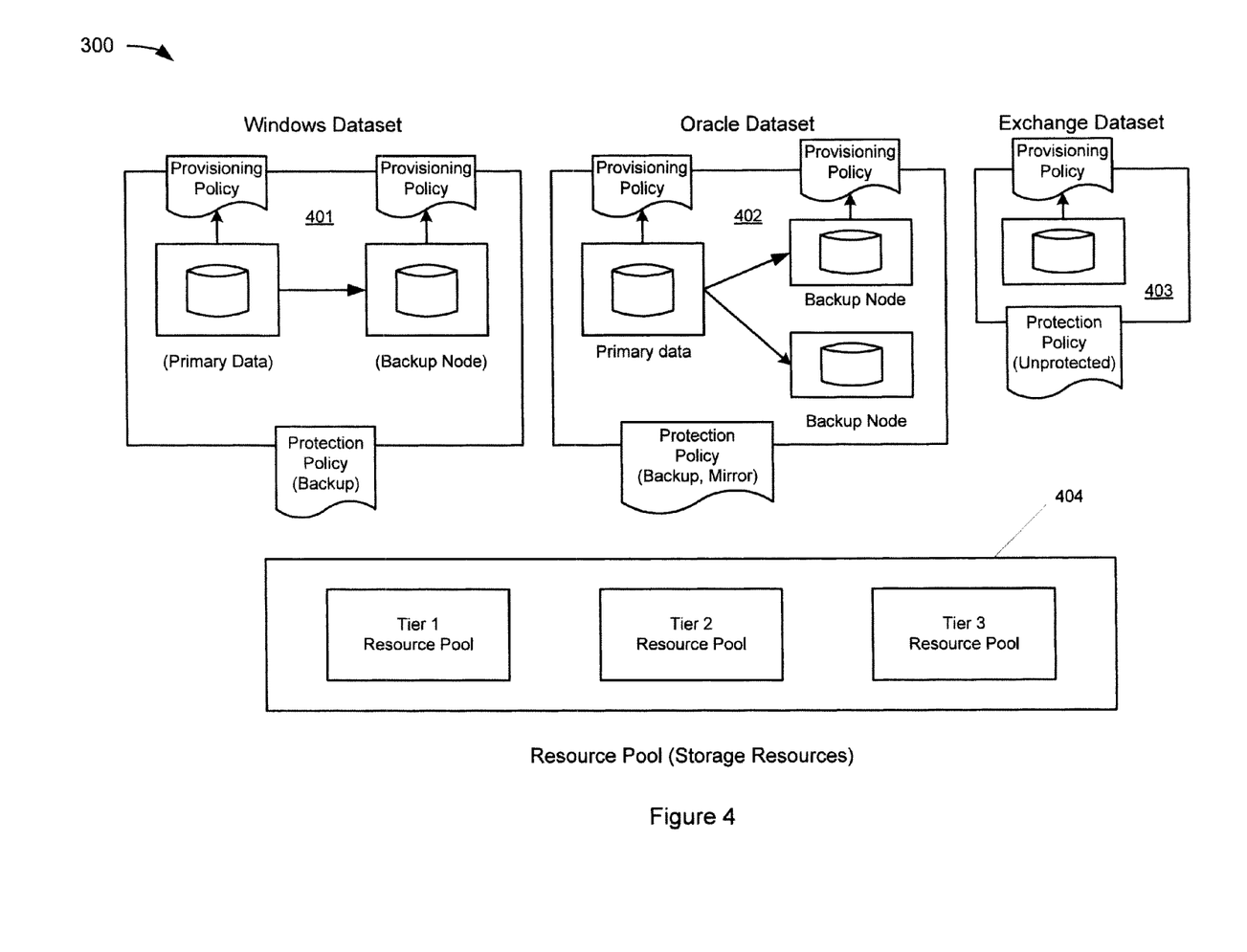
FIG. 4 is a block diagram illustrating a data administration view of a storage network in one embodiment.

In addition to storage capacity, a resource pool (such as shown in FIG. 4) also contains the attributes and capabilities of the underlying storage systems in the pool. These attributes include the data access protocols supported and the performance and reliability of the physical resources (e.g., storage elements). These properties are automatically discovered and recorded when storage or storage systems are added to resource pools. For example, a configuration file containing attributes of a storage element can be provided (such as in an XML format) by a vendor of the storage element. In another example, benchmark routines can test the storage element to determine the attributes.

Figure 5:
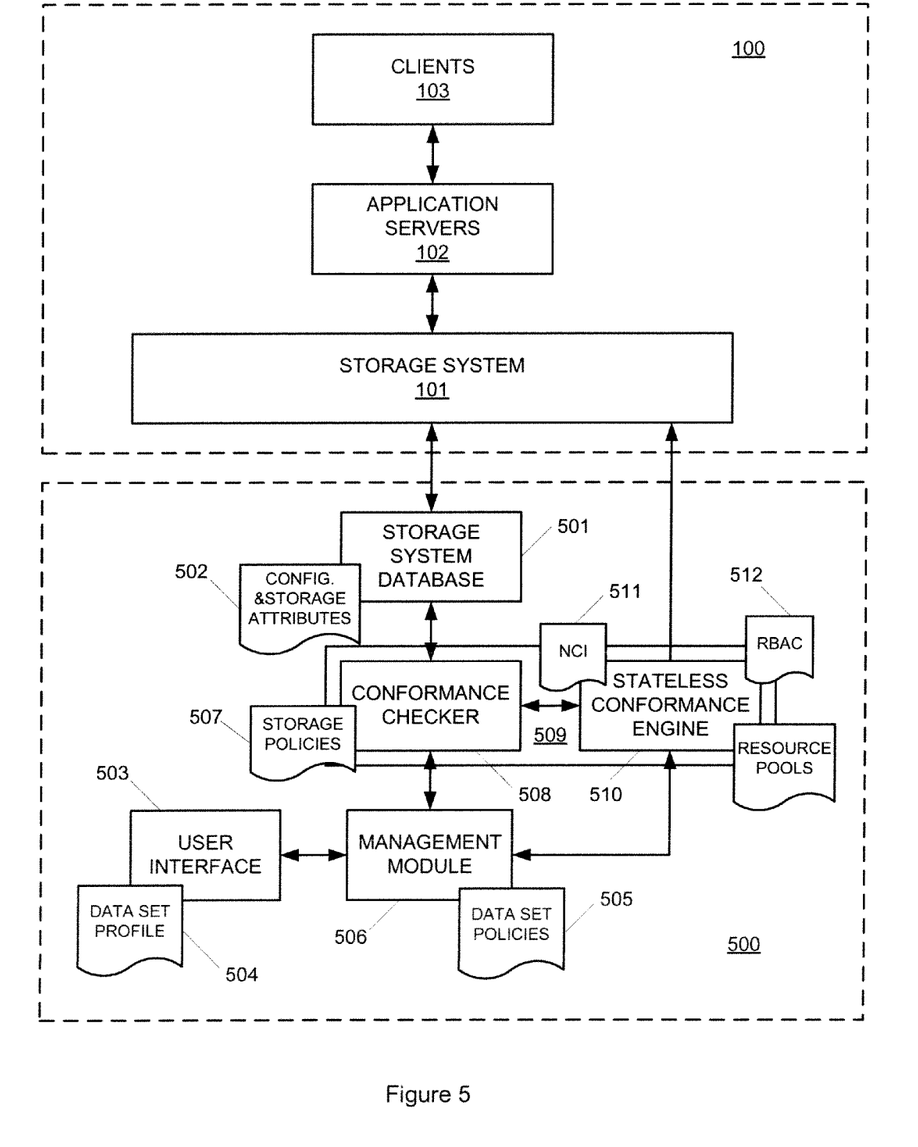
FIG. 5 is a functional block diagram illustrating a provisioning manager in one embodiment.

A conformance module (such as shown in FIG. 5) uses the capacity and attributes of resource pools when determining the best location for data to be provisioned. A single resource pool might contain different tiers of storage representing different performance and cost attributes.

Applying data management policies on an exclusive basis to individual data storage objects can lead to, for example, poor storage utilization rates when the individual storage objects do not use the data storage that is allocated to the storage objects. When data management policies are applied to resource pools as a whole, the unused resources can be effectively shared.

Since a resource pool consists of discrete quantities of storage, larger pools typically provide more opportunities to optimize for space and load balancing within that resource pool. Clustered storage architectures provide a similar opportunity by combining multiple storage nodes within a single management unit.

Although many properties of storage elements of a resource pool may be discovered automatically by reading device profile information (such as device attributes stored in a configuration file supplied by the device vendor), certain properties may be explicitly defined by administrators. This permits more flexibility and control when matching provisioning requests with available resources. For example, it might be desirable for administrators to add an explicit property related to physical location to a resource pool member. This property then might be specified as part of a provisioning policy and matched against available resources in a resource pool that has been assigned this property.

Data Sets

In one embodiment, a data set is managed as a single unit by applying a data management policy and any changes thereof to all of the storage objects in the data set. The storage containers used by a data set might change, over time, due to load or space balancing actions or policy changes. Load balancing is the distribution of workload among storage resources in a resource pool and may include metrics such as I/O rates and data transfer. These changes should be transparent to the users of the data. The data set definition is stored in a persistent database (such as discussed below with reference to FIG. 5). Data sets also have provisioning and data protection policies. The policies apply to all of the storage containers referred to by the data set.

Using a data set may serve the following purposes. A first purpose is to allow data administrators to manage their data without requiring that they understand how the storage is configured or where it is physically located. Once the data set has been defined, a user interface provides the user with a list of policies from which the administrators only have to choose the policies that best match their data management requirements.

A second purpose of a data set is to reduce the number of objects that an administrator has to deal with. A data administrator might have a lot of data that should be monitored and managed as a single unit spread across many distinct storage containers, such as an Oracle database or Microsoft Exchange applications. A data set allows both the storage and data administrators to manage and view the data as a single unit.

A data set includes all replicas of the data in the data set, wherever they reside. A third purpose of a data set, therefore, is to provide convenient access to all of the replicas of the data, allowing administrators to view or restore versions of the data without requiring knowledge of where those versions are (or were) stored.

A fourth purpose of a data set is to provide the relationships between the physical storage and the desired behavior associated with the data set's policies (as discussed below in the following paragraph). As new storage capabilities are added to the system, or policies are changed, the data management framework can re-configure the existing storage containers, or possibly to migrate data to new storage containers, to better satisfy the data set policy requirements.

Policies

Figure 8:
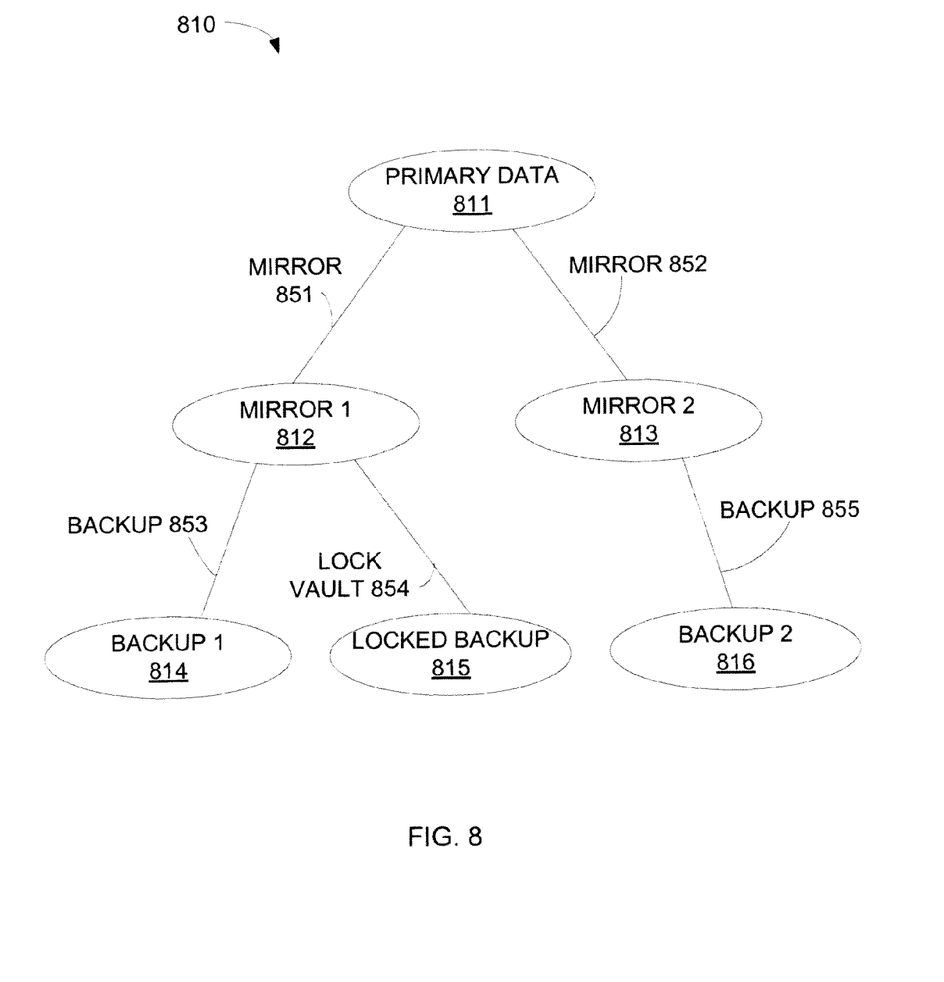
FIG. 8 illustrates a tree graph of components of a data management policy according to one embodiment of the present invention.

A data management policy is used to describe how stored data is to be protected against data loss. The policy describes an intended behavior for data storage using storage objects. In some embodiments, a data management policy may be represented by a tree graph having a number of nodes and branches. FIG. 8 shows a tree graph of one embodiment of a data management policy. The tree graph 810 includes nodes 811-216 and branches 851-255. Each node represents a storage object and is coupled to another node via a branch, which describes the relationship between the two corresponding storage objects. For example, branch 853 is marked as a "backup" connection between nodes 812 and 814. Thus, storage object represented by node 814 is a backup copy of the storage object 812. Backup copies of storage objects thus provide redundant storage. Another relationship that can be specified is a "snapshot" process in which the active file system (e.g., a file system to which data can be both written and read) at the storage site is captured and the "snapshot" is transmitted as a whole, over a network to the remote storage site. A snapshot is a persistent point in time (PPT) image of the active file system that enables quick recovery of data after data has been corrupted, lost, or altered. Snapshots can be created by copying the data at each predetermined point in time to form a consistent image, or virtually, by using a pointer to form the image of the data. Accordingly, the graph 810 represents how the administrator intends to manage data in the data storage system.

A provisioning policy consists of a set of attributes that the data set requires from a particular resource pool. Specific attributes include, but are not limited to, cost, performance, availability, how the data can be accessed and what to do in out-of-space situations.

The policies are used when data sets are provisioned, eliminating configuration errors that result from manual processes. The policies can also be given access control by the storage administrator, such that not all resources and configurations are available to all data administrators. For instance, some data administrators might not have access to policies that require highly reliable or high-performance storage (e.g., because of the expense required to satisfy those policies). Data administrators are otherwise free to select any authorized provisioning and protection policies that meet their desired data behavior without regard to how the storage is configured or located.

In practice, the data administrator might assign provisioning or protection policies to data sets having storage containers having performance attributes that do not conform to a data set provisioning policy. For example, most vendors of storage resources require that their customers purchase software licenses for various storage features such as data snapshots and data mirroring (which can be used to provide full backups). If a data set includes data that resides on a source storage object without the required license, a policy specifying a mirror relationship between a primary (main storage) and secondary (backup) storage node cannot be conformed to without re-configuration. Similarly, data administrators might add members to a primary node of the data set that are incompatible with the policy for the data set. In both cases, the conformance module can detect the conflict and explain to the data administrator why the underlying storage needs to be re-configured, or the data migrated. The administrator can cancel the operation or approve the tasks proposed by the conformance module to bring the data set into conformance.

Conformance Module

The conformance module uses the policies to configure the underlying storage. The conformance module ensures that the resources used by the data set conform to the attributes described in the associated policy. The conformance module first monitors the physical storage resource and then compares the physical storage environment to the desired configuration specified by the policies, using the management object definitions (data sets, resource pools and policies) stored in the database when it checks for policy deviations. If there is a deviation from the desired configuration, the conformance module alerts administrators to the violation and, in some cases, automatically corrects the problem.

The conformance module may include two components (see, FIG. 5). The first component, a conformance checker, performs a comparison between the policy associated with the data set and the allocated resources, and then prepares a list of proposed actions to bring the data set into conformance. The second component, the conformance engine, executes the resulting actions.

The separation of the conformance engine from the conformance checker allows the user to evaluate the potential effects of executing the task list (by producing a "dry-run") before the task list is executed. This allows administrators to review cases in which policy changes might result in temporary slow-downs of a network hosting the data set (such as re-establishing a replica on different storage elements). The dry-run also allows administrators to review any and all changes before committing to them.

For example, the conformance checker may periodically compare data protection relationships for protecting the storage objects of a data set in accordance with the policy associated with the data set. For example, the policy may require volume A to be mirrored to volume B, where volume A is on storage server A and volume B is on storage server B. Then the conformance checker checks whether there is a mirroring relationship between storage server A and storage server B. If not, then the data set is not in conformance.

For each node in the data set, the conformance engine determines the type of data protection relationship, or relationships, for which the policy dictates that this node should be the source. Then, for each physical resource associated with the node, the conformance engine attempts to find a data protection relationship of this type originating with the member and terminating with a member of the destination node for each of the node's outgoing connections. If a relationship is not found, a task can be generated to implement the relationship.

The results of a conformance check include a task list and an explanation of what actions the system will perform to bring the data set into conformance with the configured policy. Various tasks in the task list that typically could be expected to cause relatively large changes can be presented to administrator for the administrator's approval and/or intervention (whereas tasks that typically could be expected to have relatively minor changes can be pre-approved, for example). Approval from other users (such as a supervisor) can be required before executing tasks that typically can be expected to cause relatively large changes. The secondary approval allows the work flow of a user to be managed, which can reduce the risk of negative impacts on system performance. It is also possible that irresolvable tasks will be generated which require user intervention before they can be executed (e.g., adding physical resources).

Role-Based Access Control (RBAC)

An RBAC table is used to control management access to all of the storage objects being managed. The RBAC table allows an administrator to specify which roles can perform which operations on which objects. Whenever any operation is attempted on any targeted object, the conformance module uses an RBAC table to verify that the operation is permissible for the targeted object. The RBAC table can be maintained in the same persistent storage as the data sets, policies and resource pools.

The RBAC table may be used in conjunction with a separate authentication service that manages a user ID database. The RBAC table allows storage administrators to delegate responsibility to data administrators that, without relinquishing control over the particular resources used, to safely allow data administrators to select policies and resource pools for their data sets.

Comparison of Conventional and Data Set Views

Figure 3:
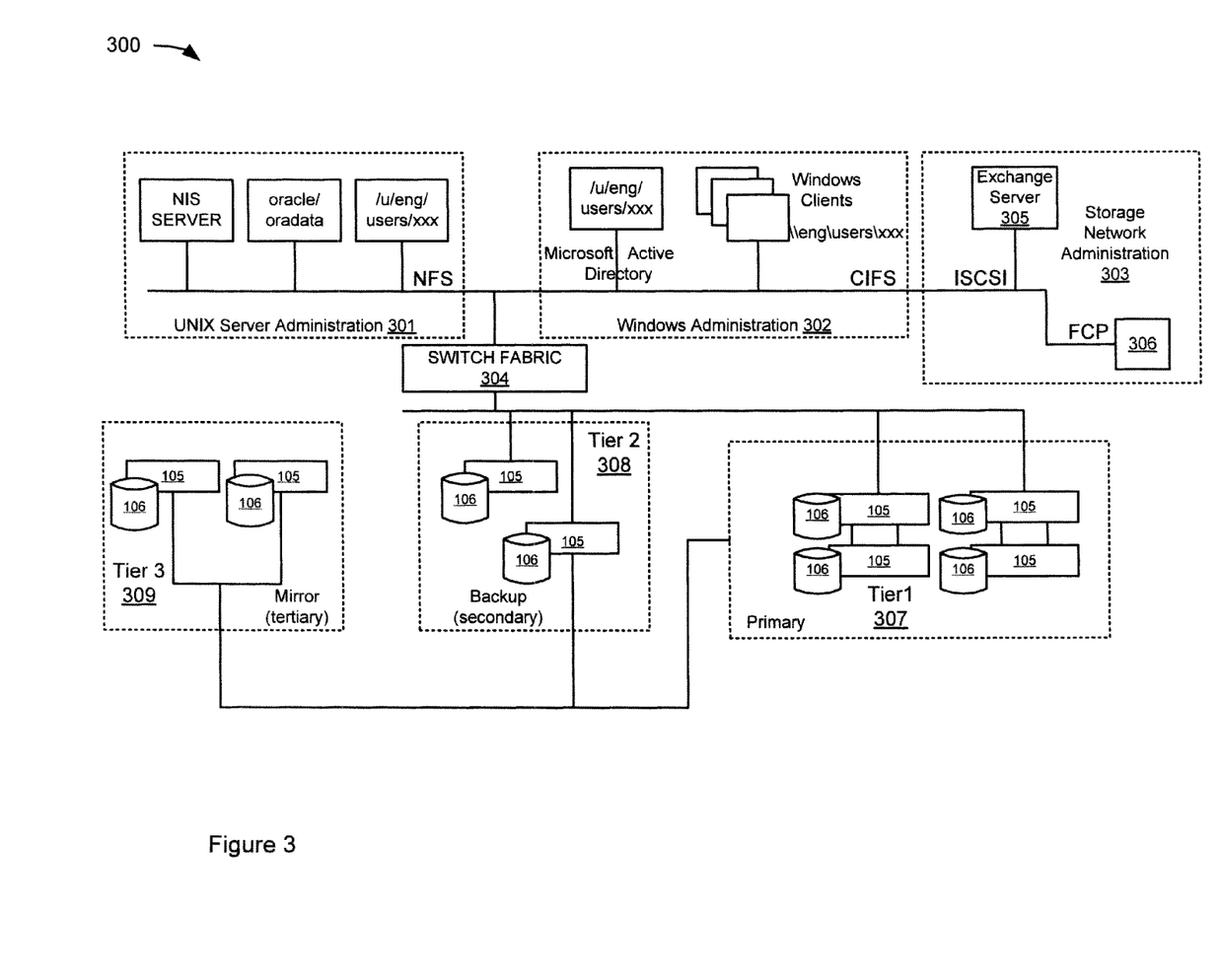
FIG. 3 is a block diagram illustrating a storage administration view of a storage network in one embodiment.

FIG. 3 illustrates a storage administrator's conventional view of a storage network 300. In FIG. 3, it is assumed for purposes of illustration that storage network 300 represents a data center with users that have home directories that are accessed with NFS and CIFS, a UNIX-based Oracle deployment over NFS, a Microsoft Windows deployment and a Microsoft Exchange deployment: each having varying degrees of data protection. The conventional view presents a detailed schematic of how the infrastructure is currently configured.

In FIG. 3, a collection of UNIX servers in UNIX server administration 301 accesses Oracle storage via switch fabric 304 using the NFS protocol. Switch fabric 304 may be any combination of network switches, routers, etc. A collection of Windows servers and clients in Windows administration 302 uses the CIFS protocol to access Windows storage via switch fabric 304. The Microsoft Exchange server 305 in storage network administration 303 uses the iSCSI protocol to access storage. The Microsoft Exchange server 305 may include application storage provisioning and data snapshot management (e.g., using SnapDriver® for Windows available from Network Appliance of Sunnyvale, Calif.). Storage network administration 303 may also include storage provisioning and data snapshot management 306 for the UNIX servers using FCP (e.g., using SnapDrive® for UNIX available from Network Appliance of Sunnyvale, Calif.).

The storage tiers represent varying levels of storage resiliency and performance. Tier 1 storage 307 includes storage servers 105 and storage devices (e.g., RAID arrays) 106 and is used for primary data storage. Tier 2 storage 308 and Tier 3 storage equipment (other configurations of storage servers 105 and storage devices 106 are used to store secondary and tertiary backups, respectively. The differing tiers may have different levels of performance (as listed in their attributes that are either discovered by benchmark routines or provided by vendors in attribute files).

FIG. 4 illustrates the data set view of storage network 300 according to one embodiment. In FIG. 4, a data set is defined for each application (home directories data set 401, Oracle data set 402 and Exchange data set 403) that includes the data associated with the application, replicas of that data, and the associated provisioning and protection policies. This view illustrates which data is using which physical resources and which data management (provisioning and data protection policies) are associated therewith. The data set view also aggregates the physical infrastructure 404. Rather than seeing a schematic layout with specific components, it can be seen that there are three different tiers of storage that can be used for protection and provisioning. The data set view is easier to use when performing daily management tasks. The schematic view allows physical components to be manipulated directly, such as when hardware fails or needs to be changed.

Data set view of FIG. 4 provides a data-centric view of the organization of the physical resources. Implementation details of the underlying storage hardware and software in the resource pools are hidden from the user.

Implementation of a Provisioning Manager

FIG. 5 illustrates a functional block diagram of a provisioning manager 500 in one embodiment, coupled with a storage network such as storage network 100. Provisioning manager 500 can reside on a console such as storage admin console 107 or data admin console 108. Provisioning manager 500 includes a storage system database 501 that reads and stores the current configuration and storage attributes 502 of storage system 101. Provisioning manager 500 also includes a user interface 503 that may be used by a data administrator to specify a data set profile 504 that includes a collection of data set policies 505 associated with a particular data set. A management module 506 maps the data set policies 505 to a set of corresponding storage policies 507 previously established by a storage administrator as described above. The management module 506 maps the data set policies 505 to the set of corresponding storage policies 507 by identifying the physical resources (specified by nodes in storage policies 507) that are associated with each node in the data set policy 505. The management module 506 provides the storage policies 507 to the conformance checker 508, which is part of conformance module 509 as described above. Conformance checker 508 compares the configuration of the physical resources of the data set and their storage attributes 502, stored in database 501, with the storage policies 507 to determine if the current configuration and storage attributes of storage system 101 conform to the storage policies 507.

If storage system 101 is in conformance, then no action is required. However, if storage system 101 is not in conformance, conformance checker 509 generates nonconformance information 511 (such as a task list). The nonconformance information 511 is passed to a stateless conformance engine 510, a part of conformance module 509, which is configured to use the nonconformance information 511 to provision allocable resources of storage system 101 to bring storage system 101 into conformance (such as by executing tasks in a task list). Conformance engine 510 is stateless in that it requires no information regarding any previous state of storage system 101. Conformance engine 510 uses the nonconformance information 511 in conjunction with the storage policies 507, role-based access controls 512 and resource pools 513 to select and configure resources to bring storage system 101 into conformance. For example, a data set that is provisioned using a backup node having a network bandwidth attribute of 10 MHz (stored in storage attributes 502 is found to not be in compliance with the storage policy, which specifies that all nodes of the data set must have a network bandwidth attribute of at least 100 MHz. The conformance checker 508 generates task list with a task for allocating a storage element having a network bandwidth attribute of at least 100 MHz. The task list is passed to the conformance engine, which executes the task list and allocates for the data set a storage element having a network bandwidth attribute of at least 100 MHz.

In one scenario, prospective changes to storage system 101 may be reported to a data administrator, through a user interface (or some other reporting path) for authorization to commit the changes. In another scenario, the required changes to storage system 101 may be implemented automatically and continuously based on periodic conformance checks by conformance checker 508. In other scenarios, the required changes to storage system 101 may not be attainable within the constraints of the RBAC, the available resource pools and the permitted storage polices (such as when sufficient memory cannot be allocated). In these scenarios, intervention of a storage administrator may be required to manually modify one or more of the management objects (data sets, resource pools and policies) or infrastructure components.

Figure 6:
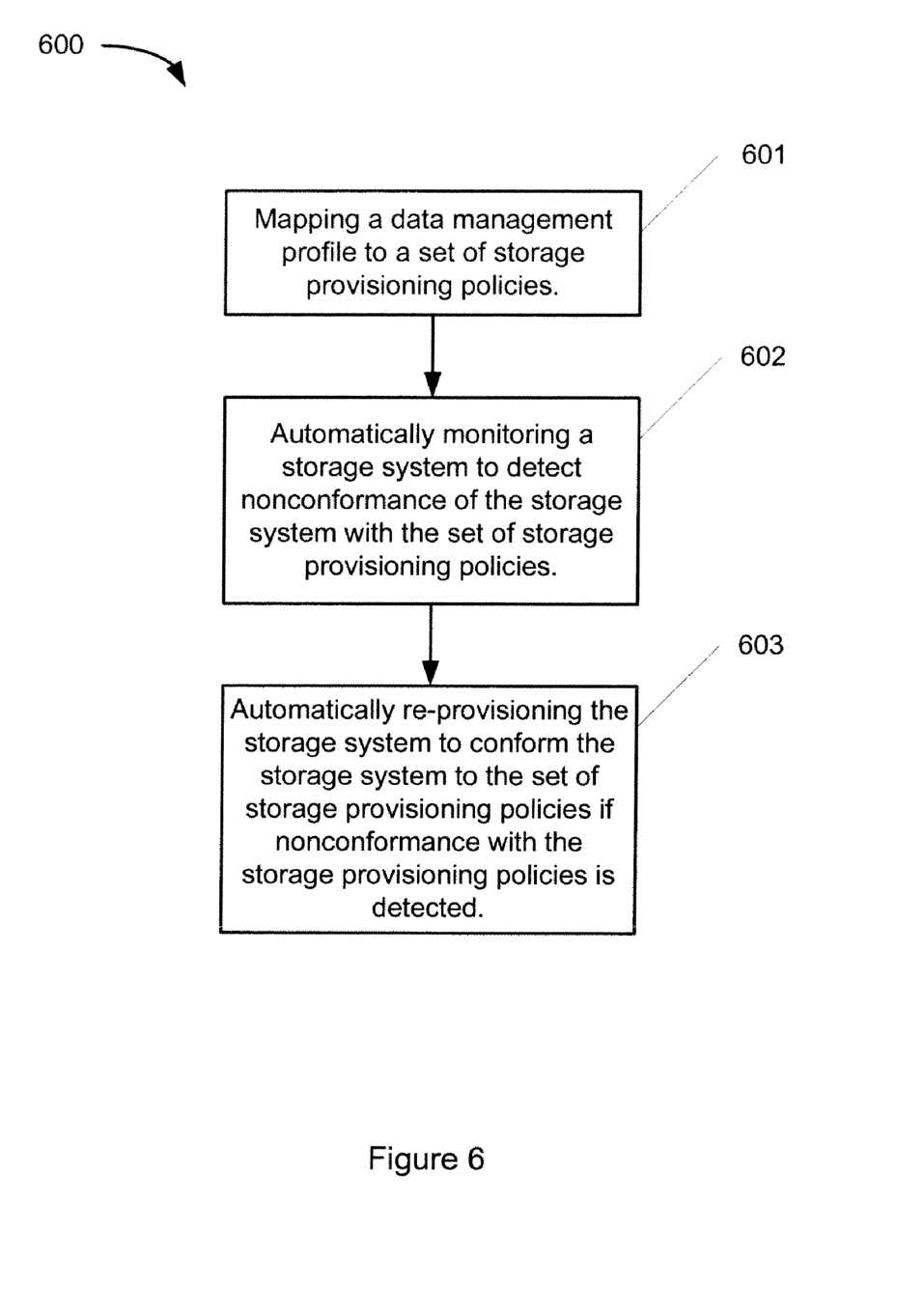
FIG. 6 is a flowchart illustrating a method for automated provisioning in one embodiment.

FIG. 6 is a flowchart 600 illustrating operations of a method described above with respect to FIG. 5 in one embodiment. In operation 601, a data management profile is mapped to a set of storage provisioning policies. The storage administrator specifies the provisioning policies for each node in the data set by manually assigning them using a graphical user interface (GUI) or a command line interface (CLI) provided by the management module 506 in the user interface 503, for example. That is, a correspondence is established between each data management policy (e.g., redundancy, reliability, etc) in the data management profile and one or more storage provisioning policies, using mapping rules established by a storage administrator, for example. In operation 602, a storage system is automatically monitored to detect nonconformance of the storage system to the set of storage provisioning policies. The management module monitors the attributes of each storage system under management by "polling" the storage element (e.g., physical resource) for information. (For example, the management module can poll a storage volume to determine the percentage and amount of memory used). Different attributes are polled at different intervals depending on their perceived importance or rates of change. For example, file system information may be requested every 15 minutes, while user quota information may be requested every six hours (user quotas are limits on how much space a user is permitted to use on a storage system). In operation 603, the storage system is automatically re-provisioned (by allocating additional physical resources, for example) to conform the storage system to the set of storage provisioning policies if nonconformance is detected. For example, if a secondary storage volume no longer has space to grow, a new volume can be provisioned on a storage system with more available storage space and the primary storage resources will be reconfigured to backup data to the new volume. The provisioning policy associated with this provisioning operation could be, for example:

> if old secondary storage volume is full;
> then locate unallocated secondary storage resource with at least same storage performance attributes;
> provision unallocated secondary storage resource as new secondary storage volume; and
> reconfigure primary storage to backup data to new secondary storage volume.

Figure 7:
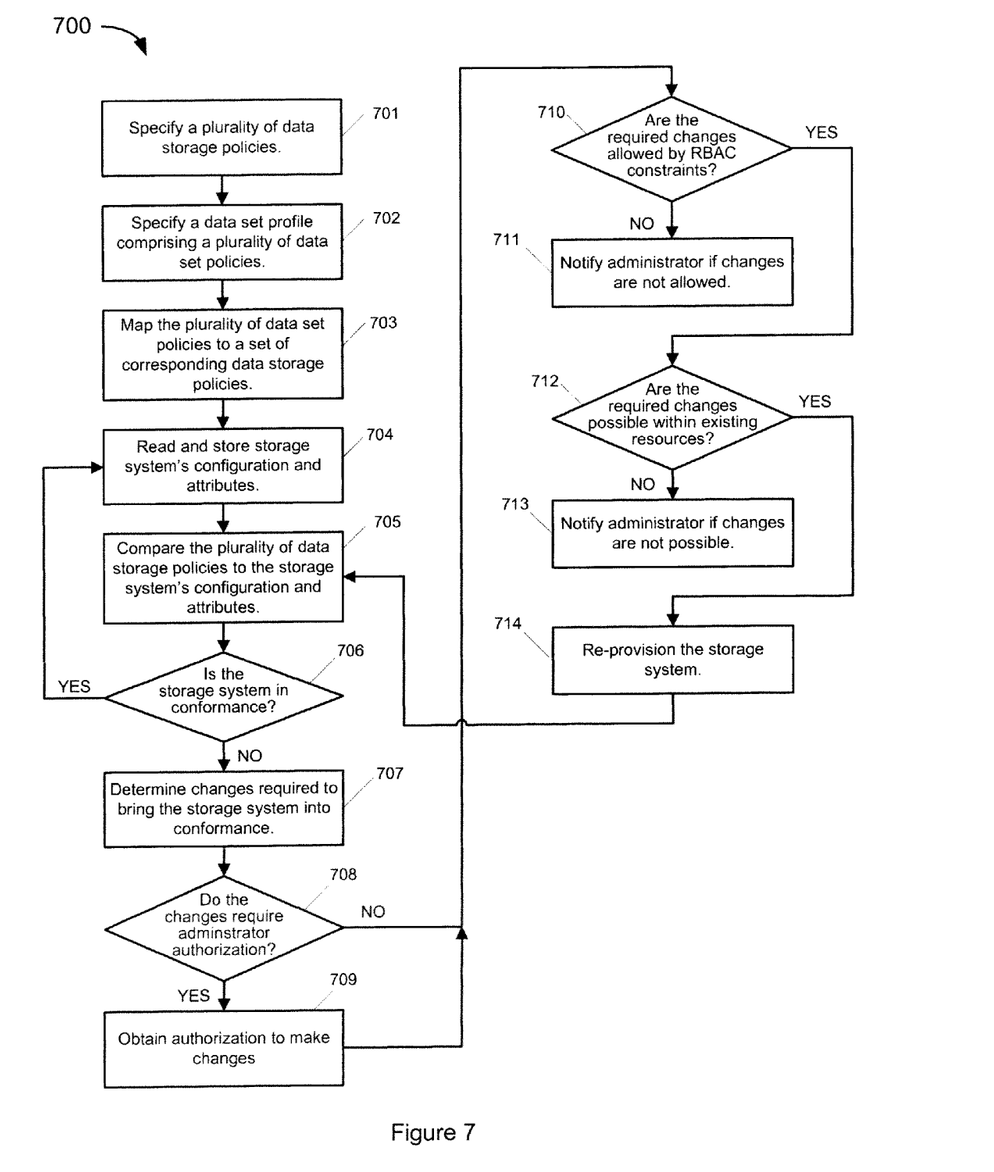
FIG. 7 is a flowchart illustrating a method for automated provisioning in another embodiment.

FIG. 7 is a detailed flowchart 700 illustrating operations of the method described above with respect to FIG. 5 in one embodiment. In operation 701, a data set-based storage system receives data set profile (from the data administrator, for example) that comprises a plurality of data management policies. In operation 702, the storage system receives a plurality of storage provisioning policies (from the data administrator, for example). In operation 703, the plurality of data management policies is mapped to a set of storage provisioning policies (by identifying the physical resources used to provision each node of the data set, for example). One or more dynamic references in a data set node may be associated with one storage provisioning policy in a one-to-one or many-to-one relationship. For example, an entire storage system can be provisioned for a data set, so that all of the volumes in the storage system, at present and in the future, are defined as elements of the data set. The association between the data set and the storage resources varies dynamically as volumes are created and deleted. In operation 704, the configuration and attributes of the storage system is read and stored. In operation, 705, the corresponding data storage policies are compared with the storage system's state and attributes by performing a conformance check as described above. In operation 706, it is determined from the conformance check if the storage system is in conformance. If the storage system is in conformance, then the method returns to operation 704. If the storage system is not in conformance, then operation 707 determines the changes required to bring the storage system into compliance. Operation 708 determines if the required changes are in a class of changes that requires administrator authorization. If administrator authorization is required, it is obtained in operation 709. The method then continues at operation 710 which determines if the required changes are allowed by role-based access control constraints imposed by a storage administrator. If the changes are not allowed, the data administrator is notified at operation 711. Otherwise, operation 712 determines if the required changes are possible within the existing resource pools for example, by polling volumes within the resource pool to determine if sufficient unallocated memory is present, for example). If the changes are not possible, then the data administrator and/or storage administrator are notified at operation 713. If the changes are possible, the storage system is automatically re-provisioned at operation 714. The method then returns to operation 705.

The data management framework described above reduces the number of management entities for data and storage administrators by allowing the administrators to apply operations to a data set as a single unit. Rather than having to administer each individual element of a data set (for example, all of the home directories associated with a data set), the data administrator manages a single data set. For the storage administrator, data sets eliminate the need to monitor individual storage containers and relationships to determine whether or not the data set is provisioned in accordance with a provisioning policy. In addition, the use of resource pools reduces the need to manually manage space by automatically provisioning physical resources (when possible).

Embodiments of the invention also allow data administrators and others to implement data management policies that could not otherwise be implemented. In one embodiment, the conformance module uses storage device attributes (e.g., by detecting a storage device manufacturer, model number and serial number in a ROM or NVRAM chip in the storage device) including list cost, asset depreciation algorithms associated with the storage device and active and passive energy consumption of the storage device, which the conformance engine can use to compute a cost per unit storage (e.g., dollars per gigabyte).

For example, a user can input the purchase price of a storage device, the number of years per Internal Revenue Service (IRS) regulations over which the device can be depreciated (e.g., three years for accelerated depreciation). The conformance module can divide the purchase price of the storage device by the number of years for depreciation (for straight-line depreciation) to determine a cost per year for the device. The cost per year can be divided by the amount of available storage on the device to derive a cost rate of, for example, dollars per gigabyte per year. As described above, the cost rate can be applied to all of the storage resources of a data set automatically to determine a single cost for the data set as a single unit. Cost balancing or cost minimization across a storage resource pool by, for example, allocating storage resources across one or more data sets.

In one embodiment, the data administrator may identify elements of a data set that require the fastest and most expensive storage and those that do not by specifying the desired attribute requirements in a provisioning policy of the data set. The conformance checker detects any nonconformity and generates a task list so that the conformance engine can allocate storage in accordance with the desired attribute requirements.

In one embodiment, a storage service provider (SSP) may have a service level agreement (SLA) to provide a quality of service (QoS) above some guaranteed level in terms of data availability, data rates and data reliability for a customer. The desired attributes are entered into the provisioning policy of the data set for the customer. The SSP can use the automatic and continuous re-provisioning capability of the provisioning manager to continuously fine-tune the allocation of resources to meet the SLA by selecting resources closely matched to the desired attributes.

In one embodiment, a data administrator may use the provisioning manager to implement data and storage policies based on data "affinity." As used herein, data affinity is the property of a data set that measures the utility of data as a function of its level of consolidation. For example, data with low affinity may be spread over several storage servers to gain the performance advantage of lightly loaded storage resources. Data with a high affinity (such as data for a video stream) may only be useful if they are consolidated on the same aggregate. A data set can be given an affinity attribute (such as on a scale of one to ten) in its provisioning policy. The conformance checker can use the affinity attribute to control the degree of apportionment of data across various physical resources in a data set. (For example, a data set having an affinity of "ten" would not be apportioned across various devices.)

It will also be apparent to those skilled in the art that the automated processes described herein may provide a reduction in the cost of administrating a storage network by eliminating human error and reducing the workload of administrators.

The present invention can be implemented by an apparatus for performing the operations herein. This apparatus may be specially constructed for the required purposes or it may comprise a machine, such as a general-purpose computer selectively activated or configured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

Although the present invention has been described with reference to specific exemplary embodiments, it will be recognized that the invention is not limited to the embodiments described, but can be practiced with modification and alteration within the spirit and scope of the appended claims. Numerous specific details have been set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known components, devices or methods have not been described in detail in order to avoid unnecessarily obscuring embodiments of the present invention.

Accordingly, the specification and drawings are to be regarded in an illustrative sense rather than a restrictive sense. Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

A storage server is a processing system adapted to store and retrieve data on behalf of one or more client processing systems ("clients") in response to external input/output (I/O) requests received from clients. A storage server can provide clients with a file-level access to data stored in a set of mass storage devices, such as magnetic or optical storage disks or tapes. Alternatively, a storage system can provide clients with a block-level access to stored data, rather than file-level access, or with both file-level access and block-level access.

Data storage space may be organized as one or more storage "volumes" mapped to one or more physical storage disks or other storage devices, defining an overall logical arrangement of storage space. The disks within a volume are typically organized as one or more groups of Redundant Arrays of Independent (or Inexpensive) Disks (RAID). A volume may contain one or more file systems. A file system imposes a structure (e.g., hierarchical structure) on files, directories and/or other data containers stored and/or managed by a storage server. Application data sent to a storage server from a client system for storage may be divided up into fixed-size physical data blocks stored on disks within a volume.

What is claimed is:

1. A method comprising:
   automatically mapping, by a server including a processor, a data management profile of a data set to a plurality of storage provisioning policies, the data management profile comprising a plurality of data management policies, the data management profile managed by a data administrator and the plurality of storage provisioning policies created by a storage administrator, the data administrator and the storage administrator operating independently of each other, the data management profile comprising a plurality of nodes, the mapping comprising identifying a physical resource in the plurality of storage provisioning policies that is associated with a node in one of the plurality of data management policies, each storage provisioning policy comprising a set of physical resource attributes required by the data set, wherein the set of attributes comprises data affinity, wherein the data affinity defines a utility of data as a function of a level of consolidation of the data;
   automatically monitoring, by the server, a storage system to detect nonconformance of the storage system with the plurality of storage provisioning policies; and
   automatically re-provisioning, by the server, the data set on the storage system to conform the storage system to the plurality of storage provisioning policies when nonconformance with the plurality of storage provisioning policies is detected.

2. The method of claim 1, further comprising notifying an administrative user if the changes required for re-provisioning the storage system are not authorized by a role-based access control policy.

3. The method of claim 2, further comprising notifying an administrative user if an available storage resource pool cannot re-provision the storage system to conform the storage system to the storage provisioning policy.

4. The method of claim 1, wherein the data management profile comprises at least one of a data protection policy, a load-balancing policy, a cost-balancing policy, a data affinity policy, and a service level agreement policy.

5. The method of claim 1, wherein the set of attributes further comprises a data rate that exceeds a predefined threshold.

6. The method of claim 1, wherein the set of attributes further comprises a type of storage, the type of storage specifying at least one of a speed of storage or a cost of storage.

7. A storage provisioning manager comprising:
   a storage system database to read configuration and storage attribute data from a storage system and to hold a plurality of storage policies;
   a conformance module coupled with the storage system database to compare the plurality of storage policies with the configuration and storage attribute data and to automatically re-provision the storage system to conform with the plurality of storage policies;
   a management module coupled with the conformance module to receive a data management profile comprising a plurality of data management policies and to map the plurality of data management policies to the plurality of storage policies, the data management profile managed by a data administrator and the plurality of storage policies created by a storage administrator, the data administrator and the storage administrator operating independently of each other, the data management profile comprising a plurality of nodes, the mapping comprising identifying a physical resource in the plurality of storage policies that is associated with a node in one of the plurality of data management policies, each storage policy comprising a set of physical resource attributes required by the data set, wherein the set of attributes comprises data affinity, wherein the data affinity defines a utility of data as a function of a level of consolidation of the data;

a conformance checker to compare the plurality of storage policies with the configuration and storage attribute data; and a stateless conformance engine to receive non-conformance information from the conformance checker, to evaluate the non-conformance information with respect to role-based access control constraints and available storage resource pools, and to re-provision the storage system to conform to the plurality of data management policies.

8. The provisioning manager of claim 7, wherein the plurality of data management policies comprises one or more of a data protection policy, a load-balancing policy, a cost balancing policy, a service level agreement policy and a data affinity policy.

9. A system, comprising:
a memory;
a conformance engine with storage system awareness, wherein the conformance engine is configured to translate a set of data management policies for a data set to a corresponding set of storage provisioning policies and to provision the resources of the storage system to conform the storage system to the data management policies, the set of data management policies managed by a data administrator and the plurality of storage provisioning policies created by a storage administrator, the data administrator and the storage administrator operating independently of each other, the set of data management policies comprising a plurality of nodes, the translation comprising identifying a physical resource in the set of storage provisioning policies that is associated with a node in the set of data management policies, each storage provisioning policy comprising a set of physical resource attributes required by the data set, wherein the set of attributes comprises data affinity, wherein the data affinity defines a utility of data as a function of a level of consolidation of the data; and a conformance checker configured to continuously and automatically compare the provisioning of the storage system resources to a provisioning required to conform the storage system to the data management policies.

10. An article of manufacture, comprising a non-transitory computer-readable medium having instructions stored thereon which, when executed by a computer, cause the computer to perform operations comprising:

automatically mapping a data management profile of a data set to a plurality of storage provisioning policies, the data management profile comprising a plurality of data management policies, the data set managed by a data administrator and the plurality of storage provisioning policies created by a storage administrator, the data administrator and the storage administrator operating independently of each other, the data management profile comprising a plurality of nodes, the mapping comprising identifying a physical resource in the plurality of storage provisioning policies that is associated with a node in one of the plurality of data management policies, each storage provisioning policy comprising a set of physical resource attributes required by the data set, wherein the set of attributes comprises data affinity, wherein the data affinity defines a utility of data as a function of a level of consolidation of the data;

automatically monitoring a storage system to detect non-conformance of the storage system with the storage provisioning policy;

automatically re-provisioning the storage system to conform the storage system to the storage provisioning policies when nonconformance with the storage provisioning policies is detected; and notifying a storage system administrator if the storage system cannot be automatically re-provisioned to conform the state of the storage system to the provisioning policy.

11. The article of manufacture of claim 10, further including instructions which, when executed by the computer, cause the computer to perform further operations comprising determining the changes required for re-provisioning the storage system before re-provisioning the storage system.

12. The article of manufacture of claim 11, further including instructions which, when executed by the computer, cause the computer to perform further operations comprising notifying an administrative user if the changes required for re-provisioning the storage system are not authorized by a role-based access control policy.

13. The article of manufacture of claim 10, wherein the data management profile comprises a one of a data protection policy, a load-balancing policy, a cost-balancing policy, a data affinity policy, and a service level agreement policy.

14. A method comprising:
identifying, by a server including a processor, physical resources of a data set, wherein the physical resources include performance attributes, the data set managed by a data administrator and the physical resources managed by a storage administrator, the data administrator and the storage administrator operating independently of each other, wherein the data set comprises a plurality of nodes;

receiving, by the server, a data set provisioning policy for the data set, the data set provisioning policy having performance requirements, each storage provisioning policy comprising a set of physical resource attributes required by the data set, wherein the set of attributes comprises data affinity, wherein the data affinity defines a utility of data as a function of a level of consolidation of the data;

determining, by the server, whether the performance attributes of the identified physical resources meet or exceed the performance requirements of the received data set provisioning policy;

identifying, by the server, a set of tasks that can be performed to increase conformance of the data set state to the data set provisioning policy;

generating, by the server, a task list using tasks from the set of tasks; and executing, by the server, the task list.

15. The method of claim 14, wherein the performance attribute is a cost rate.

16. The method of claim 14, wherein the dataset includes one or more physical resources having matched attributes.

17. The method of claim 16, wherein a relationship is established between a first physical resource and a second physical resource.

18. The method of claim 17, wherein the relationship is at least one of a mirror relationship where the first physical resource is a source storage object and the second physical resource is a destination physical resource and a snapshot relationship where the first physical resource is a source storage object and the second physical resource is a destination physical resource.

19. The method of claim 14, further comprising automatically mapping a data management profile of the data set to a plurality of data set provisioning policies, the data management profile comprising a plurality of data set provisioning policies.

20. The method of claim 14, further comprising continuously and automatically compare the provisioning of the physical resources to a provisioning required to conform the physical resources to the data provisioning policies.

* * * * *